United States Patent [19]

Johnson

[11] Patent Number: 4,566,829
[45] Date of Patent: Jan. 28, 1986

[54] TAPPING ATTACHMENT AND INDEXING MECHANISM THEREFOR

[75] Inventor: Allan S. Johnson, Newport Beach, Calif.

[73] Assignee: Tapmatic Corporation, Irvine, Calif.

[21] Appl. No.: 697,666

[22] Filed: Feb. 4, 1985

[51] Int. Cl.⁴ .................. B23B 31/10; B23G 1/00; B23G 5/14

[52] U.S. Cl. .................. 408/239 R; 10/134; 10/141 H; 409/232

[58] Field of Search .......... 10/134, 135 R, 139 R, 10/141 H; 408/139, 239, 239 A; 409/232, 233, 234

[56] References Cited

U.S. PATENT DOCUMENTS

| | | | |
|---|---|---|---|
| 3,481,248 | 12/1969 | Engstrom | 408/239 A |
| 3,691,899 | 9/1972 | Antonietto et al. | 409/232 |
| 4,008,646 | 2/1977 | Hague et al. | 409/233 |
| 4,014,421 | 3/1977 | Johnson | 408/139 X |
| 4,172,683 | 10/1979 | Shimajiri et al. | 409/233 X |
| 4,356,621 | 11/1982 | Tomita et al. | 409/233 X |
| 4,409,721 | 10/1983 | Tomita et al. | 409/232 X |
| 4,417,377 | 11/1983 | Brezina | 408/239 R |

Primary Examiner—E. Michael Combs
Attorney, Agent, or Firm—Herzig & Yanny

[57] ABSTRACT

A tapping attachment includes a housing and a shaft, the shaft being associable with a source of rotational energy to cause forward or reverse drive of a tapping spindle which carries a tap which is intended to do work upon a work piece. The shaft of the tapping attachment is provided with a collar having a recess therein. Associated with the housing is an indexing mechanism including a housing, a spring biased plunger insertable into the housing for limited movement therein, and a bracket arm operably associated with the plunger. The bracket arm includes a radially projecting extension insertable into the recess of the collar to fix the shaft in a desired position and also an axially extending arm engageable with a boss on a machining center to fix the housings relative to the drive imparting machine and also to disengage the radial extension from the collar to permit rotation of the shaft and inner workings of the tapping attachment.

11 Claims, 5 Drawing Figures

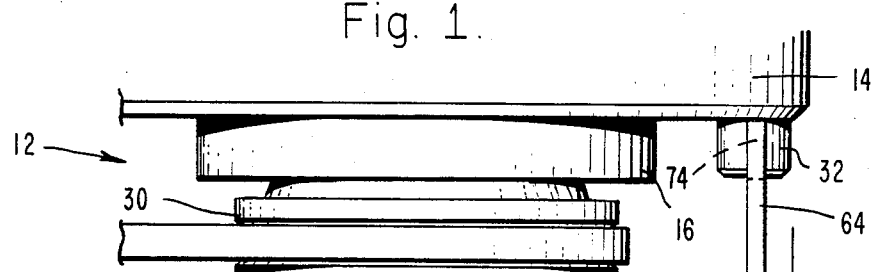
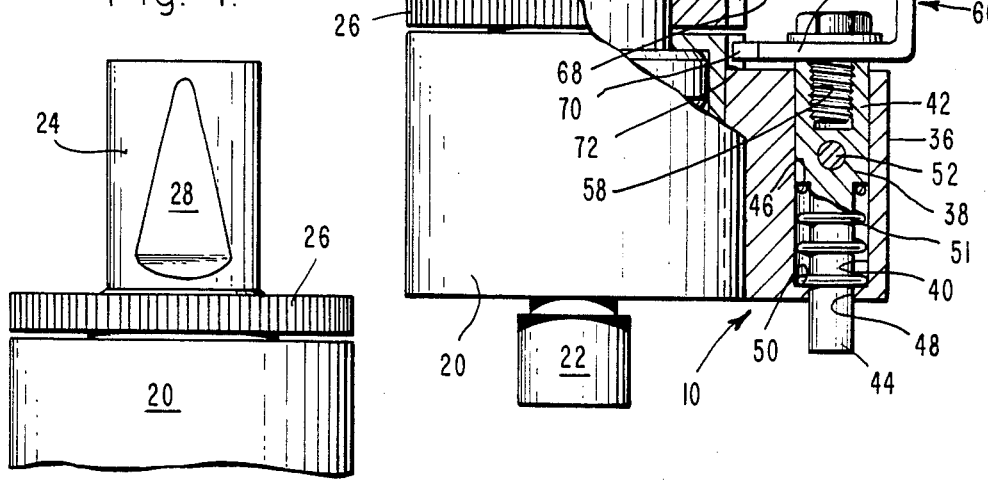
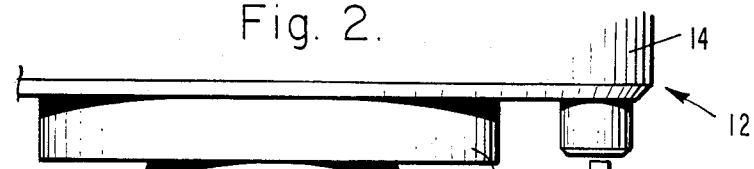
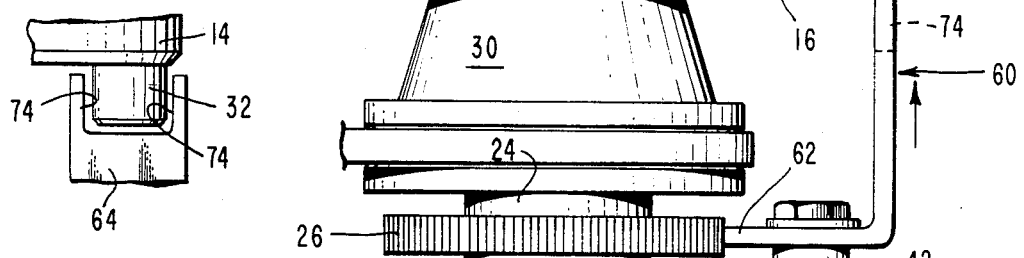
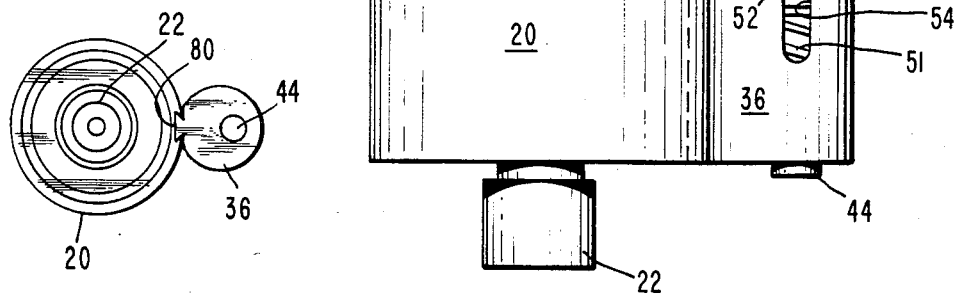

TAPPING ATTACHMENT AND INDEXING MECHANISM THEREFOR

BACKGROUND OF THE INVENTION

1. Field of the Invention

This invention relates to tapping attachments and indexing systems therefor.

2. Description of the Prior Art

The background of art with respect to tapping attachments such as the present invention is exemplified in prior art patents of this inventor, to wit: U.S. Pat. Nos. 3,002,206; 3,041,893; 3,397,588; 3,717,892; 3,791,756; 3,946,844; 3,999,642; and 4,014,421, and co-pending U.S. patent applications Ser. No. 06/641,431, entitled Tapping Attachment and Drive Train Therefor, filed Aug. 16, 1984; and 06/641,381, entitled Automatic Tapping Attachment and Drive System Therefor, filed Aug. 16, 1984, all of which are hereby incorporated herein by reference as though set forth fully. The background patents disclose the characteristics of tapping attachments of the present type and the basic operating advantages thereof.

SUMMARY OF THE INVENTION

With the birth of the computer age, very few fields of endeavor have escaped the advantages of automation. This is as true of machining operations as any other field of endeavor. Therefore, many operations in which it is desired to tap holes in a workpiece have been computer programmed into machines which require little, if any, human interaction. This is also true of the loading and unloading of various workpieces, including tapping attachments, onto computer programmed machining centers.

In order to completely mechanize a machining operation in which a variety of tools including taps and tapping attachments are utilized, one must also realize that stringent parameters must be adhered to including the orientation of the tapping attachment in storage areas for automatic loading and unloading thereof into the driving machine. It is the problems associated with this aspect of automated machining operations that the present invention addresses.

The present invention thus contemplates a tapping attachment of the type which includes a housing, a drive shaft, and a tapping spindle which carries the tap. Rotation is imparted to the tap through the shaft and to the spindle so that the desired tapping operation may be performed upon the workpiece and the tap retracted from the workpiece when the work function is accomplished. The present invention includes a tapping attachment of the type above described and incorporated by reference herein as though set forth fully, having an indexing system of rugged construction operably associated therewith which permits orientation of the tapping attachment in a desired position for storage, but yet permits relatively easy automated loading of the tapping attachment into the driving machine.

Thus, the present invention provides a collar having a recess therein associated with the shaft of the tapping attachment. The indexing system includes a second housing suitably secured to the housing of the tapping attachment and having a spring biased plunger therein. Associated with the plunger is bracket having an radially projecting arm engagable and disengagable with the recess of the collar to lock the tapping attachment in a desired location for storage and free the tapping attachment for operation respectively. Associated with the radially projecting extension is an axially oriented arm preferably engagable with a boss attached to the driving machine itself to prevent the tapping attachment housing from rotating during operation and also move the radially projecting arm out of engagement with the collar. Upon disengagement of the tapping attachment from the tapping machine, the spring biased plunger forces the radial arm into the recess of the collar and is permitted to do so because of disengagement of the axial arm from the boss on the tapping machine.

BRIEF DESCRIPTION OF THE DRAWINGS

FIG. 1 is a partially sectioned elevational view of a driving machine, tapping attachment and indexing system according to the present invention in a first position;

FIG. 2 is an elevational view of the tapping attachment of FIG. 1 in a second position;

FIG. 3 is a bottom plan view of a tapping attachment in accordance with the present invention;

FIG. 4 is a side elevational view of a portion of the tapping attachment of the present invention; and FIG. 5 is an elevational view of a portion of the indexing system turned 180° of the tapping attachment of the present invention.

DESCRIPTION OF THE PREFERRED EMBODIMENT

Referring now to the drawings, a tapping attachment and indexing system therefor generally designated by the reference numerals 10 is shown in conjunction with a driving machine generally designated by the reference numeral 12. The machine 12 is shown to include a quill 14, and a machine spindle 16. The tapping attachment 10 is shown to include a housing 20, a spindle 22 and a drive shaft 24. The shaft 24 projects out of the housing 20 and receives a collar 26 which has a central bore through which the shaft is inserted. The collar is secured as by a set screw (not shown) to the shaft 24 to make the two fixed relative to each other. The shaft 24 is provided with a notched area 28 (as shown in FIG. 4) to make insertion of the shaft into an adaptor 30 possible. The adaptor 30 and shaft 24 are suitably secured by any conventional means to form a single rotatable structure.

The indexing system of the present invention serves a dual function. First, when disengaged from the machine 12 as shown in FIG. 2, the indexing system serves to orient the tapping attachment in a desired position for storage. When the tapping attachment 10 is engaged with the machine as shown in FIG. 1 the indexing system frees the collar 26 and thus the tapping attachment 10 to rotate, but secures the tapping attachment housing 20 for stationary positioning during rotation of the shaft 24 and spindle 22, by interacting with the boss 32 attached to the machine and acting as a stop arm as more fully described hereinbelow.

The tapping attachment indexing system includes a housing 36 and a spring biased plunger 38 which is contained within a central bore 40 of the indexing system housing. The plunger 38 includes an enlarged upper portion 42 and a smaller lower portion 44 to thus present a shoulder 46. The bore 40 in the housing at the upper end is open to the ambient and at the bottom opens through a reduced diameter aperture 48. The lower portion 44 of the plunger 38 extends through reduced diameter aperture 48 which presents a shoulder 50 on the inside of bore 40.

A spring or other suitable biasing element 51 is placed within the bore 40 and brought to bear upon shoulder 46 of the plunger and shoulder 50 of the housing to thus urge the plunger upwardly.

The plunger 38 is provided with a radially disposed shaft 52 which extends through an aperture in the plunger 58. The housing 36 of the indexing system is provided with an elongated slot 54 (FIG. 2) through which the shaft 52 extends to thus constrain and limit movement of the plunger 38 within the indexing system housing 36. The upper portion 42 of the plunger 38 is provided with a threaded bore 58. An "L" shaped bracket 60 which is suitably apertured is secured atop the plunger by insertion of a bolt through the bracket which engages the threads in threaded bore 58. The "L" shaped bracket includes a radially extending arm 62 and an axially extending arm 64.

The collar 26 is provided with a recess 68 and the free end of the radial arm 62 is provided with a reduced size stop 70. The housing 20 of the tapping attachment is similarly provided with a recess 72 of similar shape to the recess 68 in collar 26. The free end of the axially extending arm 64 of the bracket 60 is provided with a two-pronged fork arrangement 74 which may engage machine quill 14 to force plunger 38 downwardly in bore 40 and also trap boss 32 (attached to the machine quill) between the forks 74. When this occurs, the radial arm 62 of the "L" shaped bracket is also forced downwardly as shown in FIG. 1 thereby removing the reduced size stop of the bracket from recess 68 in collar 26 and forcing the stop into recess 72 of the tapping attachment housing 20. Thus, with the tapping attachment, and indexing system shown as in FIG. 1 rotation of the shaft 24 of the tapping attachment and spindle 22 are permitted. However, the interaction of stop 70 with the recess 72 (in the housing 20 of the tapping attachment) and forks 74 with boss 32 act as a stop arm to prevent rotation of the housing. Withdrawal of the tapping attachment 10, from the tapping machine 12 (as shown in FIG. 2) causes the plunger 38 to move upwardly in bore 40 moving the reduced size stop 70 of the radial arm of the bracket from the recess 72 (of the tapping attachment housing 20) into the recess 68 (of the collar), thus preventing rotation of the shaft of the tapping attachment and orienting the same in a desired position for storage in a storage bin. Thus, the machine or another automated mechanism may move the tapping attachment into the storage area automatically and store the same in a desired position without human the intervention. Full automation of the tapping operation may thus be achieved.

Referring now to FIG. 3, it is readily seen that the housing 36 of the indexing system is provided with a dovetail tenon 80 which is inserted into a compatible mortise 81 in housing 20 of the tapping attachment. A stable and secure interengagement of the two housings 36 and 20 is thus achieved.

The foregoing disclosure is representative of a preferred form of the invention and is to be interpreted in an illustrative rather than in a limiting sense. The invention is to be accorded the full scopes of the claims appended hereto.

What is claimed:

1. A tapping attachment of the type used in conjunction with a machining center which is a source of rotational drive having a base, including:
   (a) rotatable assembly, comprising further:
      (1) an input shaft means for receiving rotational drive from the machining center;
      (2) a first stationary housing which receives said input shaft to permit rotation thereof within the first housing, said housing having an elongated channel on the outer surface thereof; and
      (3) an output shaft means mechanically connectable to said input shaft for transmitting said rotational drive to a tool to do work upon a work piece; and
   (b) an indexing assembly means for maintaining the rotating assembly in a non-rotatable state comprising:
      (1) a second stationary housing having an elongated protrusion slidably positioned in said enlongated channel to interlock the first and second stationary housings together into a rugged compact assembly;
      (2) means mechanically connectable to said input shaft for permitting the input shaft to be non-rotatably locked in a pre-determined angular orientation;
      (3) bracket means mounted on said second housing for movement between a first position in which it interacts with said means for permitting the input shaft to be locked to lock said input shaft in said non-rotable angular orientation and a second position free of said means to permit locking and thus permit rotation of said input shaft.

2. The tapping attachment of claim 1, said elongated protrusion comprising a dovetail tenon.

3. The tapping attachment of claim 2, said elongated slot comprising a dovetail mortise.

4. The tapping attachment of claim 1, said means for permitting the input shaft to be locked comprising a collar rotatable with said input shaft.

5. The tapping attachment of claim 4, said collar including a recess.

6. The tapping attachment of claim 5, said bracket means including:
   a stop engagable with said recess of said collar when the bracket is in said first position.

7. The tapping attachment of claim 6, said first housing having a recess therein for receiving said stop when the bracket is in the second position to prevent rotation of the first housing.

8. The tapping attachment of claim 6, said bracket means being operably associated with a spring biased plunger received within said second housing for constrained limited movement therein.

9. A tapping attachment of the type used in conjunction with the machining center having a base which is a source of rotational drive, comprising:
   a first housing having a dovetail mortise on the outer surface thereof;
   an input shaft means for receiving rotational drive from the machining center, said input shaft being received within said first housing for rotation therein;
   a collar having a recess therein secured to said input shaft for rotation therewith;
   an output shaft mechanically connectable to said input shaft for transmitting rotational drive to a tool to do work upon a workpiece;

a second housing having an elongated dovetail tenon, on the outer surface thereof, said tenon being slidably positioned in said mortise of said first housing to form a compact and rugged assembly;

a spring biased plunger received within said second housing for constrained limited movement therein;

an "L" shaped bracket having radially and axially extending arms, said bracket being secured to said plunger for movement therewith, said radially extending arm having a stop engagable with, the recess of said collar to prevent rotation thereof to non-rotatably lock said input shaft in a predetermined angular orientation when said bracket is in a first position, and movable to a second position of disengagement with said collar; said axially extending arm engagable with the base of the machine to move said stop to said second position and prevent rotation of said housings and to permit movement of said stop to said first position when said axially extending arm is not engaged with the base of the machine.

10. The tapping attachment of claim 9, said first housing including a recess for receiving said stop when in the second position to prevent rotation of said housings.

11. The tapping attachment of claim 9, said axially extending arm including a fork engagable with a boss on said base to prevent rotation of said housings.

* * * * *